United States Patent
Fawley

[11] Patent Number: 5,924,262
[45] Date of Patent: Jul. 20, 1999

[54] HIGH ELONGATION REINFORCEMENT FOR CONCRETE

[76] Inventor: Norman C. Fawley, 5701 Seaside Walk, Long Beach, Calif. 90803

[21] Appl. No.: 08/638,237

[22] Filed: Apr. 26, 1996

Related U.S. Application Data

[63] Continuation-in-part of application No. 08/205,502, Mar. 4, 1994.

[51] Int. Cl.⁶ .................. E04C 3/34; E04G 23/00
[52] U.S. Cl. ............... 52/721.4; 52/723.1; 52/736.3; 52/737.4; 52/741.3; 52/745.18; 156/71
[58] Field of Search ................. 264/31, 35, 257, 264/258; 156/71, 94, 98; 52/745.18, 745.17, 746.1, 738.1, 721.4, 721.5, 723.1, 723.2, 724.5, 736.3, 736.4, 737.4, 737.5, 741.3

[56] References Cited

U.S. PATENT DOCUMENTS

| | | |
|---|---|---|
| 3,340,115 | 9/1967 | Rubenstein . |
| 3,370,998 | 2/1968 | Wiswell . |
| 3,429,758 | 2/1969 | Young . |
| 4,019,301 | 4/1977 | Fox . |
| 4,255,071 | 3/1981 | Koppers et al. . |
| 4,559,974 | 12/1985 | Fawley . |
| 4,589,562 | 5/1986 | Fawley . |
| 4,676,276 | 6/1987 | Fawley . |
| 4,700,752 | 10/1987 | Fawley . |
| 4,786,341 | 11/1988 | Kobatake et al. . |
| 5,043,033 | 8/1991 | Fyfe . |
| 5,175,973 | 1/1993 | Owen et al. . |
| 5,194,110 | 3/1993 | Fawley . |
| 5,218,810 | 6/1993 | Isley, Jr. . |
| 5,245,813 | 9/1993 | Brotz . |
| 5,289,942 | 3/1994 | Fawley . |
| 5,326,410 | 7/1994 | Boyles . |
| 5,505,030 | 4/1996 | Michalcewiz et al. . |

OTHER PUBLICATIONS

"Fiber Composite Plates Can Strength Beams", H. Saadatmanesh, et al. Concrete International, Mar. 1990, pp. 65–71.

Primary Examiner—Michael Safavi
Attorney, Agent, or Firm—Lane, Aitken & McCann

[57] ABSTRACT

In a method and apparatus for reinforcing concrete and other structural members, a plurality of cylindrical jackets are preformed. Each jacket terminates in lateral edges defining a discontinuity in the jacket, the jackets being made of high elongation high tensile strength filaments having a maximum elongation without failing of more than 8% and preferably at least about 20%. The jackets are fixed to the structural member by an adhesive, with the discontinuity of each jacket lying along a line spaced from the lines along which the discontinuities of adjacent jackets lie.

27 Claims, 6 Drawing Sheets

HIGH ELONGATION REINFORCEMENT FOR CONCRETE

CROSS REFERENCE TO RELATED APPLICATION

This is a continuation-in-part of Ser. No. 08/205,502, filed on Mar. 4, 1994.

BACKGROUND OF THE INVENTION

The present invention relates to concrete structures, such as concrete support columns for bridges, and, more particularly, to reinforcement of such structures with a composite material.

Steel reinforced concrete structures, such as bridge supports and supports in parking structures, can occasionally experience forces beyond the forces for which they were designed. This has happened a number of times during earthquakes. In earthquakes, structures undergo an excessive strain for an extended period. This characteristic causes earthquakes to weaken structures until the structures fail. In an unconfined concrete column, the acceleration of the column caused by the forces of the earthquake cause the column to either be crushed or to be sheared and the outer portions of concrete to spall off. With this spalling off of concrete, the diameter of column is reduced, its ability to support an upper structure is decreased, and the column fails, along with the upper structure. The results have been catastrophic, with the collapse of bridges and other structures, loss of life and the loss of use of major highways for many months, and even years. The cost of rebuilding collapsed structures like bridges is so high that sometimes the structures are not rebuilt. Concrete bridge columns are typically 4 to 8 feet in diameter and 20 to 60 feet high. In an earthquake, the ground shifts not only laterally, but vertically. The lateral shift causes a failure at the column base or in the mid-column because of the inertia of the upper bridge structure being at rest while the lower structure shifts laterally. In the case of the 1994 San Fernando Valley earthquake, the ground also moved up from a thrust fault, which caused the columns to fail in the middle versus the lower sections, where they failed in the 1989 Loma Prieta earthquake.

Concrete columns have the additional problem that moisture penetrates the concrete and freezes, causing the concrete to spall off. The spalling increases with the number of freeze-thaw cycles.

Pre-1971 bridge columns in California had an insufficient amount of vertical and horizontal steel, with only ½" diameter circular lap-spliced reinforcing bars approximately every 12". In the 1971 Sylmar earthquake, the 1989 Loma Prieta earthquake, and the 1994 San Fernando Valley earthquake, many of these columns exploded because of the forces, either from the ground moving up in the earthquake or from the inertia of the bridge deck collapsing down. The columns exploded radially outward in a pear-shaped fashion. More-recently constructed columns have about twice as must steel comprising their vertical reinforcing bars and a complete circumferential reinforcement cage defined by a helical ¾" diameter reinforcing bar having about 3 inches between adjacent turns of the helix.

Some concrete bridge columns which were already reinforced with embedded steel reinforcing bars have been retrofitted with steel jackets. The steel jackets typically have a thickness between ⅜" to 1 inch, depending upon a variety of conditions, including soil conditions, the original design of the column, the height of the column, the amount of load the column carries, etc. In order to retrofit existing columns with additional reinforcement, steel jackets made of semi-cylindrical sections are placed around the outside of the columns, and the sections and jackets are welded together to form adequate confinement. A drawback with the steel jackets is that they must fit as tightly as possible, even though the concrete columns are not always precise in diameter. In order to accomplish this, the columns are individually measured and those measurements are used to fabricate steel jackets of approximately the same diameter. The semi-cylindrical jacket sections are slightly oversized in radius, for example ½" to 1" oversized. After the jackets are welded in place, they are pumped with a pressurizing cement grout to serve as a medium to transfer from the concrete column to the steel jacket the loads imposed on the column. Sometimes a concrete slurry is injected between the steel jacket and the column, because of the difficulty in fitting the jacket to the column. However, there is shrinkage with the injected concrete and, therefore, there is inadequate load transfer between the column and the jacket. Furthermore, the steel jackets are very heavy and cumbersome to install, even with the aid of power cranes. Moreover, skilled workers, e.g., welders, are required to install the steel jackets, and the jackets are subject to corrosion. Thus, the steel jackets require maintenance. In addition, because the column may often be coated with a significant amount of residue and because the steel jacket may have rust on it, the bond between the two load transfer surfaces is often insignificant. Furthermore, the steel jackets make the column too stiff, which is a drawback for withstanding the forces of an earthquake.

The use of a resin pre-impregnated semi-cured material using carbon fibers or glass fibers or KEVLAR fibers and the use of a wet lay-up system involving high strength fibers and wet resin are currently being pursued. In the wrapping of columns with pre-impregnated tape, an entire machine must be brought to the job site. The use of the machine to wrap the columns can be very difficult in confining situations where the columns are placed very near walls.

Other support columns, which are commonly made of wood, such as utility poles, wharf pilings and bridge supports, occasionally experience exceptional forces, such as in winds or earthquakes. They also suffer from wood borers, other wood-eating pests, and general wear and tear. Furthermore, many wooden utility poles treated with creosote experience dry rot in their lower portions.

SUMMARY OF THE INVENTION

By the present invention, reinforcing jackets are provided which reinforce structures, such as concrete support columns, to withstand exceptional loads in earthquakes and other extraordinary events, without having the drawbacks of previously known devices. The reinforcing jackets according to the present invention increase the strength, ductility and toughness of the structures they reinforce, especially when the jackets employ high elongation fibers, thereby greatly improving the performance of the structures in earthquake conditions. By "elongation" or "ultimate elongation" is meant the greatest percentage that the fibers can elongate without failing.

Each jacket comprises a large plurality of continuous, lightweight, high strength, electrically non-conductive non-metallic high elongation fibers extending parallel to one another, and a resinous material encapsulating the fibers. The resinous material is also capable of high elongation without failing. The fibers are in an unstressed, unelongated condition before, during and after the installation of the jackets.

Concrete support columns in themselves are brittle and have limited ductility. The jackets confine the concrete and prevent the outward expansion or spalling off of concrete, thereby keeping the columns adequate to support the load of a bridge or other structure. By encapsulating the concrete columns with the jackets, there is nowhere for the concrete to go if the concrete shears or compresses and in fact turns to rubble, because the outer circumferences of the columns are contained. Before failing, high elongation fibers of more than 8% elongation, and preferably at least about 20% elongation, typically exhibit elastic deformation over a first range of tensile forces and then a plastic deformation over a second, greater range of tensile forces. These characteristics help jackets having the high elongation fibers to absorb the energy from earthquakes without failing, even though the confined concrete might fail. Consequently, the column and the structure it supports remain intact. The jackets are intended to be used with concrete columns containing steel reinforcing bars, as well as with columns which do not contain reinforcing bars.

The jackets are easy to install in the field with unskilled labor and without heavy machinery or heavy tools. The skill level required of installers is significantly lower than for steel jackets, which must be welded in place. Basic laborers can apply the jacket of the present invention on freeways, bridges or other structures. The preformed nature of the jackets permits them to be precisely premeasured as to thickness, length and diameter for the particular column on which they are to be used, such that a plurality of similar jackets provide suitable reinforcement for the entire column. The appropriate dimensions can be determined as a result of testing in a laboratory. The elimination of the need for calculating, measuring or cutting to the proper size and strength in the field permits the jackets to be installed by unskilled workers and in severe weather conditions. Because the composite jackets are produced in a factory under controlled conditions, the densities of the filaments and resin is very precise, and the mechanical properties are very uniform, especially compared to filament and resin systems which are laid up wet in the field. The dimensions can be checked, the fiber reinforcement content can be measured through resin burnoff or other laboratory tests, and, therefore, a high degree of uniformity can be obtained.

The fibers can comprise a preformed strip, with or without an attached veil of polyester or other material capable of absorbing and holding resin. The veil results in a reinforcement band having a resin-rich surface which, when cured, reduces the possibility of ingress of moisture, such as from surrounding soil, into the reinforcement band. The resin is also paintable and provides a barrier against ultraviolet radiation.

Because of the uniformity of bridge column heights and diameters, the composite column reinforcement members of the present invention are well suited to high volume manufacture and ease of installation in the field. The jackets are light enough to be very easily handled by two installers. The jackets are made relatively thin e.g., so that, if additional reinforcement is required at the base of the column, the middle or the top of the column, additional reinforcement members can simply be placed over the outside of previously applied members, thereby making the system as "application friendly" and adaptable as possible in the field. Furthermore, the filaments and resin comprise a composite material which is resistant to alkali attack and ultraviolet radiation.

The jackets define almost complete cylinders having peripheral edges defining the bases of the cylinders and lateral edges extending generally transverse to the bases. When one of the jackets is in place on a column, there is a discontinuity in the cylinder defined by the jacket, at the lateral edges. There can be a gap between the lateral edges at the discontinuity, or the lateral edges can be in abutment with one another at the discontinuity.

The composite reinforcing jackets have a large plurality of unstressed, unelongated continuous high strength filaments extending circumferentially in the jackets to prevent a concrete column from failing in a radial or circumferential direction. Additionally, a large plurality of the continuous high strength filaments can be included in the jackets in the longitudinal direction to support the column from bending or shearing sideways.

High tensile strength fibers having a high elongation are used in the jackets to greatly increase the ability of the concrete structural member to absorb energy before failure. High elongation fibers go through a significant plastic deformation range when they approach the limit of the tensile forces they can bear. As a result, reinforcement jackets according to the present invention using high elongation fibers can undergo significant elongation without failing. This characteristic is especially advantageous during earthquakes, in which tremendous energy is imposed on the structural members over a relatively long period of time. Many times more energy can be absorbed by structural members reinforced by such high elongation high tensile strength fibers than by previous reinforced structural members. The reinforcement according to the present invention employing high elongation high tensile strength fibers exhibits exceptional toughness, the ability to absorb energy, which can be visualized as the area under an entire stress-strain curve for the material. Unlike steel, many nonmetallic high tensile strength fibers are linearly elastic in tension up to an elongation on the order of 3%, where they fail suddenly. In contrast, the high elongation nonmetallic high tensile strength fibers of the present invention, such as nylon or a polyester, have, beyond an elastic range, a plastic range in which they continue to withstand a load. As a result of these properties, the jackets according to the present invention, when employing the high elongation fibers, cause a concrete column which they reinforce to exhibit some of the properties of steel. In addition, unlike glass fibers, high elongation filaments of, for example, polyester or nylon, are not affected by the alkalies found in concrete.

The load bearing performance of the jackets is enhanced where the high tensile strength fibers of the reinforcement have a high ultimate elongation, an elongation of more than 8% and preferably at least about 20%. The jackets of the present invention are fixed to concrete columns by a high-elongation adhesive, such as a urethane adhesive, which has an affinity for both the composite and the concrete, thereby making the jackets integral with the concrete column.

Also, because of the physical flexibility of the composite material, the jackets can be nested one inside another, possibly nesting as many as ten jackets in this manner for easy transport with minimal space requirements. With their resilience, the jackets return to their original shape when unpacked at the jobsite.

DETAILED DESCRIPTION OF THE PREFERRED EMBODIMENTS

Figure 1:
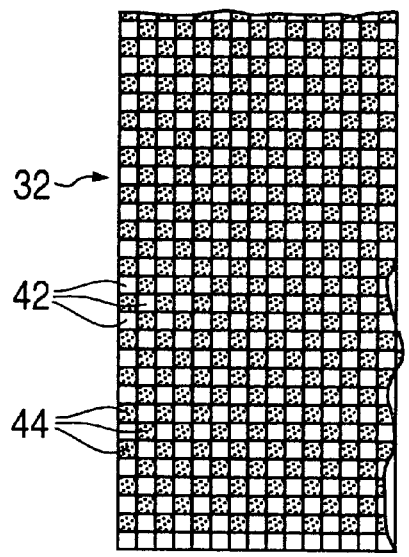
FIG. 1 is a schematic view of a tape of bidirectional fibers used in making a composite reinforcement jacket according to the present invention.
Figure 2:
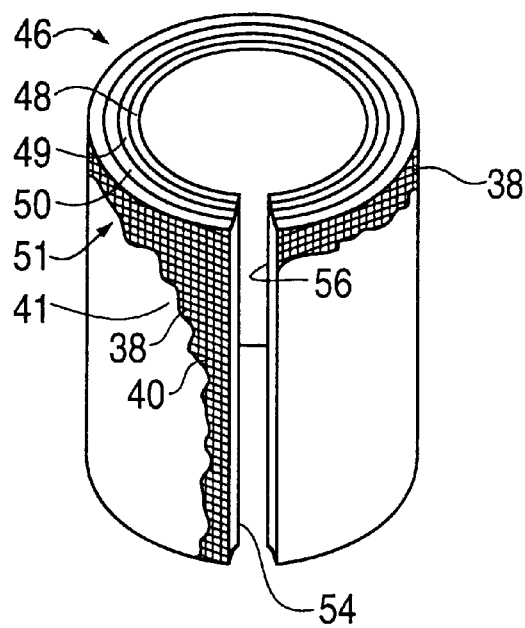
FIG. 2 is a perspective view of an assembly of composite reinforcing jackets of a first embodiment according to the present invention as fabricated, with a portion of the resin matrix of the outermost jacket removed to show the fibers.

As can be seen from FIGS. 1 and 2, reinforcement according to the present invention can be made from a web 32 of composite material including a large plurality of bidirectional, lightweight, high tensile strength, electrically nonconductive nonmetallic high elongation filaments or fibers 38 and 40 (FIG. 2) extending parallel to one another in the web 32, the fibers being encapsulated unstressed in a completely cured resin matrix 41. Each fiber 38 extends the entire length of the web 32 and is contained in one of a plurality of rovings 42, and each fiber 40 extends across the entire width of the web, at, for example, 90° to the fibers of the rovings 42 and is contained in one of a plurality of rovings 44. Although the parallel fibers 38, 40 are generally indicated in FIG. 2 by parallel lines 38 and 40, each line actually represents hundreds or thousands of the fibers.

The resin matrix 41 is applied to the fibers 38, 40 during manufacturing and prior to curing. With the resin in place and fully cured, the composite material is impervious to corrosion and most fluids. Thus, the resin protects from deterioration the fibers 38, 40 and the portion of a load bearing member, such as a concrete column, to which the reinforcement is applied. Suitable resins for the resin matrix 41 are resilient when cured and, when they are cured in the configuration of a jacket or sleeve having a split or discontinuity, they will return to the same configuration after being opened, once the opening force is removed.

As can be seen from FIG. 1, the rovings 42 of the transverse fibers 40 extend alternately over and then under adjacent rovings 44 of the fibers 38 as the fibers 40 extend from one side of the web to the other, thereby defining a woven material made of the fibers. As an alternative, the rovings of the fibers 38 and 40 are not woven, but instead the longitudinal fibers 40 lie generally in one or more first planes, and the transverse fibers 38 lie generally in one or more adjacent second planes. Stitching can be used with the unwoven alternative to hold the fibers 38 and 40 in rovings and to hold the fibers 38 in a 90° or other predetermined orientation relative to the fibers 40. The longitudinal fibers 40 can comprise 90% by weight of all of the fibers of the web 32, with the transverse fibers 38 comprising 10%. Other percentages can be used. The fibers of the web can be unidirectional, with 100% longitudinal fibers 40 and no transverse fibers 30. Depending on the forces involved in the structure to be reinforced, the fibers in the web 32 can be tri-directional, with the fibers extending in three different directions, each fiber of each group extending either the entire width or the entire length of the web 32. For example, a first group of fibers can extend in a first direction, with a second group of fibers extending in a second direction at a 60° angle to the first direction and a third group of fibers extending in a third direction oriented at 60° angles with respect to both the first and second directions.

As can be seen from FIG. 2, the reinforcement devices according to the present invention in the form of sleeves or jackets are placed around a primary load-bearing member, such as a concrete column 45 (FIG. 7), and fixed in place by an adhesive. FIG. 2 shows an assembly 46 comprising a plurality of composite reinforcement jackets 48–51. Each of the jackets 48–51 comprises one or more webs 32 of the composite reinforcement material, including the longitudinal fibers 38, the transverse fibers 40, and the completely cured resin matrix 41. A layer of a conventional release film 39 (FIGS. 4 and 5) is interposed between adjacent jackets 48–51 to facilitate the separation of the jackets 48–51 from one another. The innermost jacket 48 is formed to have an inner diameter substantially equal to the outer diameter of the column 22 to be reinforced. The innermost jacket 48 has an outer diameter which is substantially equal to the inner diameter of the jacket 49. Similarly, the jacket 49 has an outer diameter substantially equal to the inner diameter of the jacket 50, and the jacket 50 has an outer diameter substantially equal to the inner diameter of the jacket 51. Although the assembly 46 of FIG. 2 contains four concentric jackets, other numbers of jackets can be included in an assembly, depending on the size and weight of the jackets, and the ease with which they can be handled.

Figure 3:
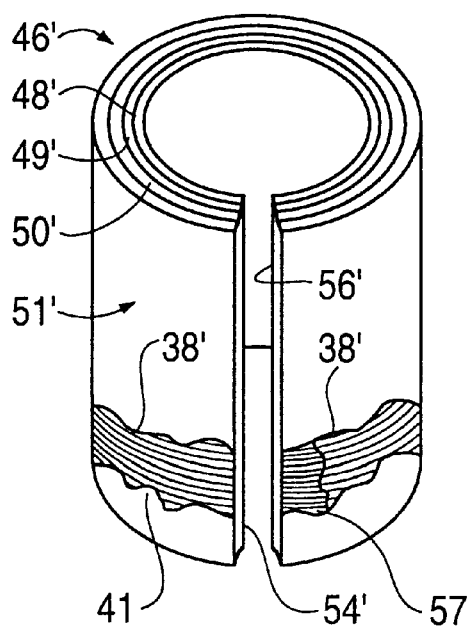
FIG. 3 is a perspective view of an assembly of composite reinforcing jackets of a second embodiment according to the present invention as fabricated, with a portion of the resin matrix of the outermost jacket removed to show the fibers.

As can be seen from FIG. 3, according to a second embodiment of the present invention, an assembly 46' comprises a plurality of composite reinforcement jackets 48'–51' in which the fibers 38' are unidirectional, that is, all of the fibers 38' in each jackets are parallel to one another. All of the fibers 38' extend the entire circumferential length of the jackets 48'–51' in which they lie. Except with respect to the directions of the fibers, all of the disclosure herein concerning the embodiment of FIG. 2 also pertains to the embodiment of FIG. 3.

A veil 57 of fibers, such as polyester fibers, can be secured to a surface of the fibers 38', for example, by stitching, to absorb the resin during the manufacture of the jackets 48'–51'. The resin-saturated veil 57, which is on the radially outward surface of the fibers 38' of each jacket 48'–51', defines a resin rich surface which, when cured, reduces the possibility of ingress of moisture, such as from surrounding soil, into the jackets. Although the veil 57 has been illustrated in connection with the embodiment of the present invention shown in FIG. 3, it can also be used with other embodiments, such as the embodiment shown in FIG. 2.

A typical width for a web 32 of the fibers 38 and 40, or height or axial dimension for the jackets 48–51, is 48 inches, and a typical thickness for each jacket is 0.100 inch to about 0.125 inch. Thus, the assembly 46 of jackets has a thickness of about ½ inch. Furthermore, it is contemplated that jackets of one-half the axial dimension of the primary jackets 48–51 will also be employed, as will be described hereinafter. The jackets 48–51 extend most of the way, that is, about 359°, around the circumference of the column 22, and a discontinuity exists between the circumferential ends 54 and 56 of the jackets, each jacket defining a cylinder having peripheral edges defining the bases of a cylinder and lateral edges extending generally transverse to the bases. When one of the jackets is in place on a column, there is a discontinuity in the cylinder defined by the jacket, at the lateral edges. There can be a gap between the lateral edges at the discontinuity, or the lateral edges can be in abutment with one another at the discontinuity. As a result of the discontinuities, the jackets 48–51 can be expanded, or opened, to extend around the column 22 or other primary load-bearing member. Due to their resilience, the jackets 48–51 return to their original sizes and configurations around the column 22 after the expanding force has been removed. Due to the presence of a release film 39 between adjacent jackets, the jackets 48–51 can be peeled away from one another easily. The composite reinforcing jackets 48–51 are lightweight, especially when compared to steel jackets, and the sizing of the jackets 48–51 to nest within one another saves considerable space when the jackets are being transported to a job site.

Figure 4:
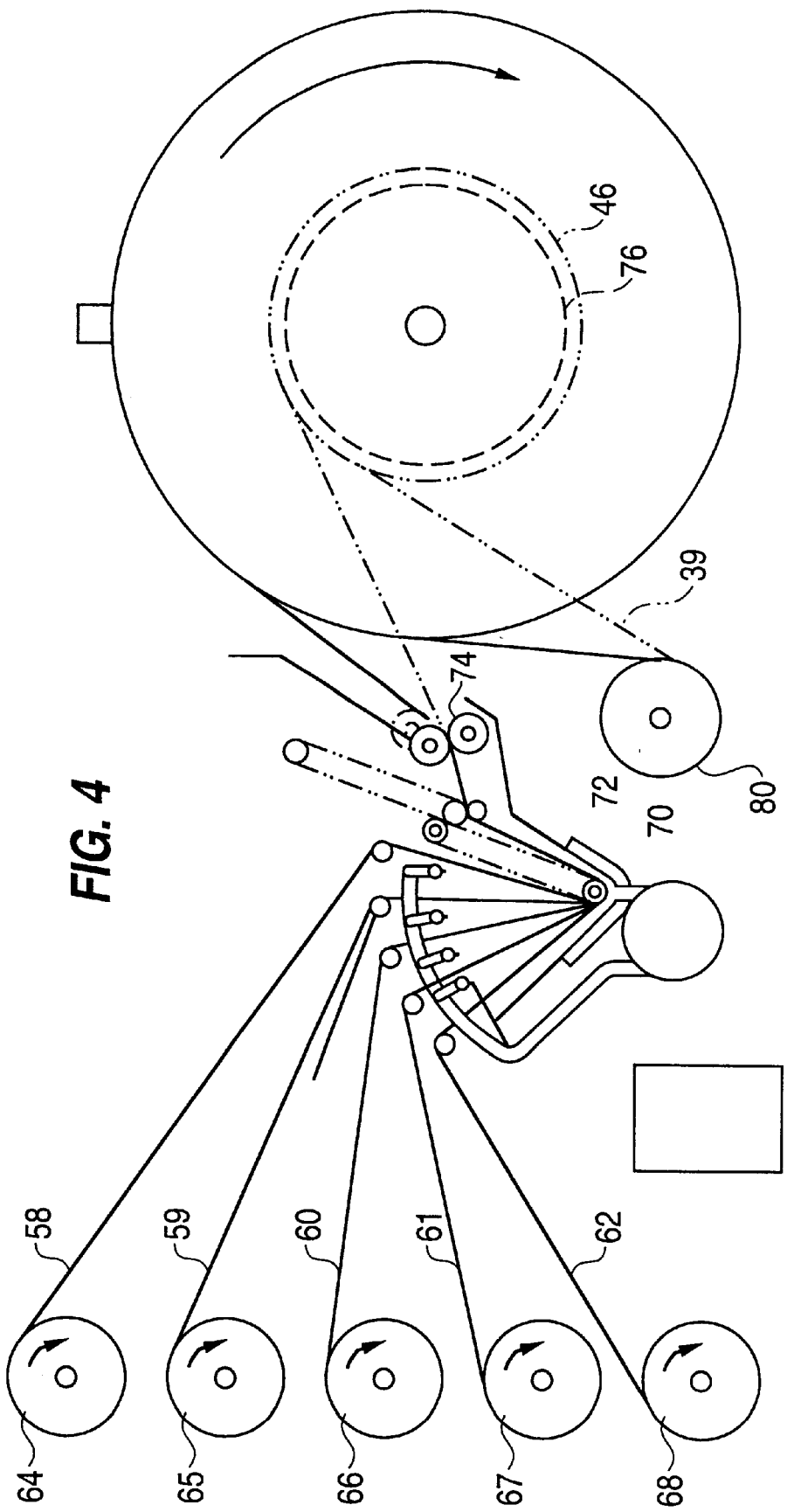
FIG. 4 is a schematic view of a process for making the assembly of composite reinforcement jackets of FIGS. 2 and 3.
Figure 5:
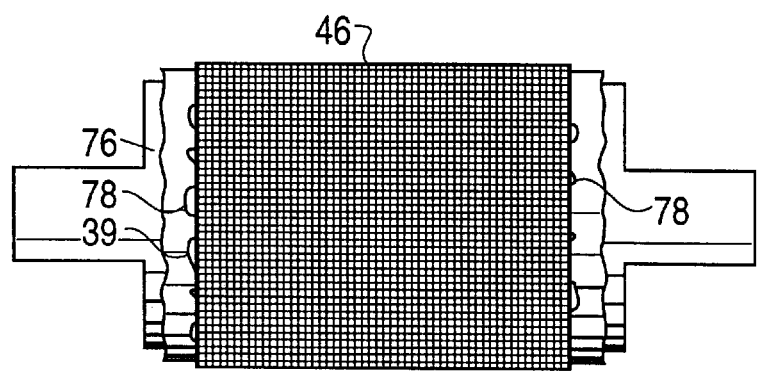
FIG. 5 is a view of the assembly of composite reinforcement jackets, in an unfinished condition, made by the process of FIG. 4.

As can be seen from FIGS. 4 and 5, the assembly 46 of jackets 48–51 can be made by bringing together and saturating a series of thin webs 58–62 of filaments, such as preformed tapes of woven fibers, for example, by feeding the webs from spools 64–68, respectively, and through a bath 70 of resin 72, squeegeeing off the excess resin with rollers 74 to define a wet impregnated strip of composite material, and winding the saturated filaments around a rotating mandrel 76 in a plurality of convolutions to define a spiral band. The mandrel 76 has an outer diameter selected to correspond to the desired minimum inner diameter of the spiral, depending on the job application. Then, the resin is completely cured, thereby establishing an elastic set in the convolutions. In order that the resin-saturated fibers on the mandrel 76 remain in discrete layers, a release film 39 of MYLAR polyester or other suitable material is applied to the outer surface of the resin-saturated fibers, for example, from a spool 80, while the fibers are being wound around the mandrel. A similar release film or release coating is applied to the mandrel 76 itself so that the assembly 46 of jackets can be removed. The curing is accomplished under the normal curing conditions for the resin used. For example, for one suitable isophthalic polyester resin, an appropriate MEK peroxide catalyst can be added to the resin in the bath and then the device can be post-cured at a heat of 140° F. (60° C.) for about two hours. As an alternative to the MEK peroxide catalyst, a cumyl hydrogen peroxide catalyst can be used, such as CHP158 of the Whitco Chemical Company of Marshall, Tex., which is cumyl hydrogen peroxide 90%. This latter catalyst, when used with No. 161-0518 isophthalic polyester resin of McWhorter Technologies of Lynwood, Calif., has a cure cycle characterized by an 8 minute gel at 180° F., followed by an 8 minute cure at 180° F., and a pot life of 18–36 hours at 70° F. In addition, a fire-resistant ablative material of a known type can be added to the resin to protect the jackets and the concrete column from the effects of fires.

The thin webs 58–62 are brought together to form a complete web 82 of desired thickness. The thin webs 58–62, when dry, comprise layers in the complete web, but when the complete web 82 is saturated with resin, a unitary strip of composite material is formed. As one example, all of the thin webs 58–62 can comprise unidirectional fibers, all of the fibers extending longitudinally. As another example, one of the thin webs can be made entirely of longitudinally oriented fibers, another thin web can be primarily transverse fibers, another thin web can be woven with 50% by weight of the fibers longitudinal and 50% of the fibers transverse, etc. A wide variety of fiber arrangements in the thin webs is contemplated, the important consideration being that the complete web has the desired amounts of fibers oriented in the desired directions. In a typical complete bidirectional web, 60%–70% by weight of the fibers are longitudinal in the web and will be oriented circumferentially around the column, and 40%–30% of the fibers are transverse in the web and will be vertical on a vertical column. The thin webs 58–62 have a width substantially equal to the axial height of the jackets 48–51 to be formed. Each convolution of the complete web on the mandrel 76 produces one reinforcing jacket. When the desired number of convolutions is achieved, the complete web is cut off at the mandrel. When the resin has cured, the spiral wound web on the mandrel 76 is cut down to the mandrel in the longitudinal direction, thereby producing the assembly 46 of jackets 48–51, with the cut forming the discontinuities between the lateral ends of the jackets, and a layer of the release film 39 being interposed between each two jackets to facilitate the separation of the jackets from one another at the job site. The assembly 46 is removed in one piece from the mandrel, and the jackets 48–51 are individually marked so that they can be installed on a support column in the correct order and size sequence.

As can be seen from FIG. 4, the interleaving release film 39 is wider than the web of fibers to prevent the resin of each convolution from running around the edges of the web and connecting with the resin of other convolutions. Prior to curing, some resin may run out onto the margins of the release film 39 and constitute regions of flash 78 after curing. The flash 78 is trimmed off.

The fibers 38 and 40 comprise on the order of 25% to 35% by weight of the composite reinforcing member, with the cured resin matrix comprising the rest. The same is true for the fibers 38' in the unidirectional embodiment. In addition, the relative amounts of the fibers 38 extending in the longitudinal direction, which will be circumferential on the column, and the fibers 40 extending in the transverse direction, which will be vertical on a vertical column, can be adjusted according to the forces to be encountered in the primary load-bearing members to be reinforced by the composite reinforcement devices according to the present invention. For example, in one application, 50% of the fibers can be fibers 38 extending in the longitudinal direction and 50% can be fibers 40 extending in the transverse direction. In another application, 90% of the fibers can be fibers 38 extending in the longitudinal direction and 10% of the fibers can be fibers 40 extending in the transverse direction. In yet another application, 100% of the fibers can extend in the longitudinal direction. Of course, many other relative amounts of fibers are possible. The fibers 38 and 40 are in an unstressed and unelongated condition in the jackets 48–51.

Suitable high elongation resins for the matrix include vinyl ester resins and isophthalic polyester resins. The resins have an elongation of at least 10%, and preferably much greater. A suitable vinyl ester resin is available under the designation Atlac 409 from Reichhold Chemical Company of Chicago, Ill., and a suitable isophthalic polyester resin is the previously described Mcwhorter 161–0518 resin.

The jackets 48–51 are each, for example, approximately 100"–125" thick and 48" in height, and the innermost jacket has an inner diameter substantially equal to the diameter of the column. Concrete columns commonly have diameters of 3, 4, 5, 6 and 8 feet. The urethane adhesive systems which can be used with the present invention develop a shear strength of between 1,000 psi and 1,200 psi. At 1,000 psi, it is calculated, based on the area of the surface, that there is 13,376,400 pounds of adhesive strength to prevent any shearing between a 6-foot diameter concrete column and a 5-foot high jacket reinforcing the column.

Figure 7:
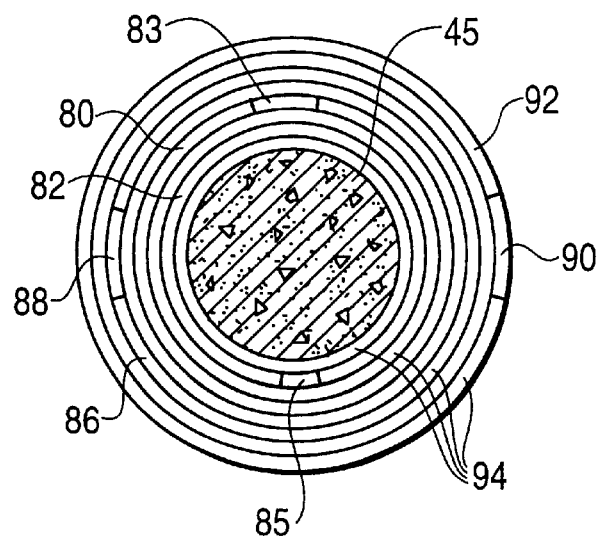
FIG. 7 is a schematic cross section taken through a support column reinforced with a plurality of the reinforcement jackets of FIG. 2 or FIG. 3.

During installation, adhesive is applied to a column and/or to jackets like the jackets 48–51, and the jackets are spread apart at their lateral ends and placed around the column. Only adhesive is present between the column and the jackets. Each jacket is clamped in place by, for example, straps 79 (FIG. 8) until the adhesive cures. As can be seen from FIG. 7, in order to prevent a discontinuity from creating a weakness in the overall reinforcement, a second jacket 80 is placed around a first jacket 82, with a discontinuity 83 of the second jacket positioned 180° around a column 84 from the discontinuity 85 of the first jacket. If the forces involved require third and even fourth layers of reinforcement, a third jacket 86 can be placed around the second jacket 80, with its discontinuity 88 positioned 90° around the circumference of the column 84 from the discontinuity 85 of the first jacket. The discontinuity 90 of a fourth jacket 92 is positioned 180° around the circumference of the column 84 from the discontinuity 88 of the third jacket 86. A layer 94 of the adhesive is interposed between each jacket, as well as between the first jacket 82 and the column 84. Although the layers of adhesive 94 may be different in thickness from the thickness of the jackets 80, 82, 86 and 92, they are shown in FIG. 7 as having the same thickness as the reinforcement bands for clarity of illustration. The number and/or thickness of the jackets employed depends upon the size of the column loads, foundation conditions and the strength requirements. A layer 94 of the adhesive bonds the first jacket 82 to the concrete column 45 and each overlying jacket 80, 86 and 92 to the adjacent underlying jacket. The adhesive can be applied by various techniques, such as with a spray gun. The jackets 82, 80, 86 and 92 can be applied using two man-lifts positioned on opposite sides of the column 45, or a platform forklift. An adhesive is used that cures anywhere in the range of from about 40° to about 100° Fahrenheit, such as Morad 695 A-B of Morton International of Chicago, Ill.

The adhesive is either a single or plural component adhesive system, which can be mixed in static mixers and pumped from drums. The adhesive can be an expanding, moisture-activated adhesive, so that the adhesive is not activated until water is applied to it by, for example, spraying. Catalyst is mixed with the sprayed water and, by changing the relative amounts of catalyst and water, the curing time of the adhesive can be changed. Based on the resin-catalyst ratio of the adhesive, the cure time, or work time, can be changed dramatically. As an example, with a pre-heated urethane adhesive system, the work time can be approximately 25–30 seconds with a catalyzed plural component system, or as much as 2 hours. The cure time on these adhesive systems at ambient temperature is approximately 4–5 hours. Both one-component and two-component adhesives are suitable for fixing the composite reinforcing members to the primary load-bearing members. The Morad A-B is a suitable two-component adhesive.

Figure 6:
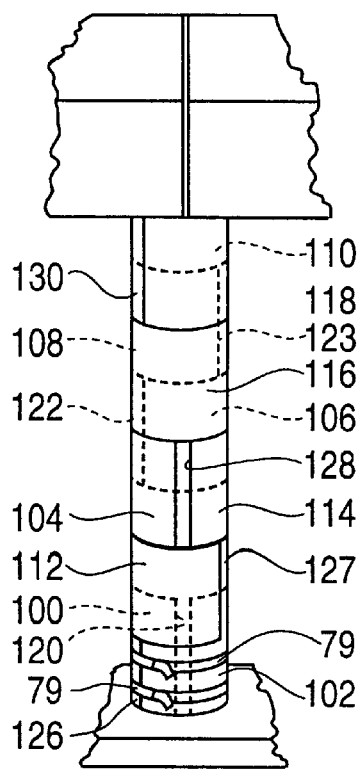
FIG. 6 is a perspective view of a reinforced support column according to the present invention, using a plurality of the reinforcement jackets of FIG. 2 or FIG. 3 to support a highway overpass.
Figure 8:
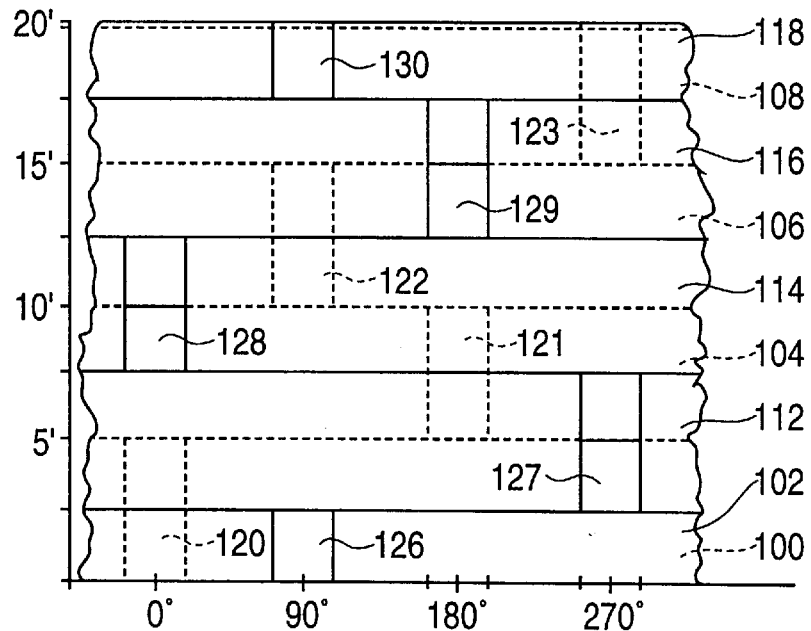
FIG. 8 is a schematic representation of layers of reinforcement jackets arranged around a support column.

In order to avoid a possible weak joint created with the arrangement of the jackets one on top of the other along the height of a concrete column, the boundaries between adjacent jackets are staggered within layers and from layer to layer. With reference to FIGS. 6 and 8, the first jacket 100 of the first layer has a first height, for example, 5'. The first jacket 102 of the second layer has a height which is one-half the height of the first jacket 100 of the first layer, that is, 2.5 feet. The first jacket of a third layer (not shown) is 5' in height, and the first jacket of a fourth layer (not shown) is 2.5 feet in height. This arrangement allows for overlap of the jackets of adjacent layers and staggered joints on adjacent layers, thereby avoiding any significant weakness in the reinforcement in certain horizontal or vertical planes. The jacket 100 and additional jackets 104, 106, 108 and 110 in the first layer all abut one another at horizontal boundaries which are staggered axially with respect to horizontal boundaries between jackets 102, 112, 114, 116 and 118 in the second layer. This is accomplished by the use of the half-height jacket 102 at the bottom of the second layer. The other jackets 112, 114, 116 and 118 of the second layer are of full height. The top jacket 110 of the first layer is half height. The discontinuities 120–124 of the sleeves 100, 104, 106, 108, and 110, respectively, are spaced circumferentially around the column from one another and also from the discontinuities 126–130 of the sleeves 102, 112, 114, 116 and 118, respectively, of the second layer. In FIG. 8, the vertical axis represents the height up the column in feet, and the horizontal axis represents the position around the circumference of the column in degrees.

Instead of axially staggering the horizontal boundaries of the jackets of adjacent layers, as is shown in FIG. 6, the horizontal boundaries of the jackets of the various layers can all be in alignment with one another, as is shown in FIG. 7. The discontinuities in the jackets of each layer are still spaced circumferentially around the column from one another and also from the discontinuities of the jackets of the adjacent layer or layers.

The jackets provide a high degree of flexibility in application, so that the needed reinforcement can be applied easily in varying amounts required in specific areas of a column, wherever needed. Thus, because the stresses imposed at the top of the column and the bottom of the column where the column contacts either the supported load, such as a roadway, or the base are greater than in other areas of the column, additional jackets can be placed in these locations. For example, if only a 0.200–0.250 inch thickness of plastic reinforcement is required at the middle of a column and a ½ inch thickness is required at the base and the top, which are plastic hinge areas, then four layers of jackets can be used at the base and the top, and two layers of jackets can be used in the middle, between the base and the top.

Figure 9:
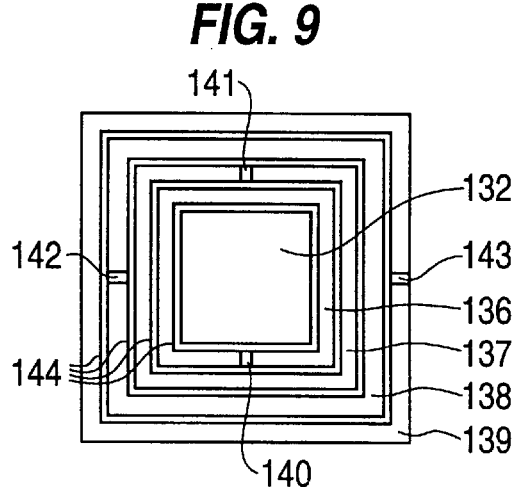
FIG. 9 is a schematic cross section through a support column reinforced by square reinforcement jackets according to the present invention.

Although the jackets were cylindrical in the example given above, the jackets can be formed in other shapes to have an interior surface which conforms to a support column. For example, the jackets can be formed in a hexagon, octagon, oval and rectangle, including a square. As can be seen from FIG. 9, for a column 132 having a square cross section, composite jackets 136–139 having discontinuities 140–143, respectively, are square in shape to fit around the column. A layer 144 of adhesive is interposed between each two of the jackets, as well as between the jacket 136 and the column 132.

Instead of axially staggering the horizontal boundaries of the jackets of adjacent layers, as is shown in FIG. 6, the horizontal boundaries of the jackets of the various layers can all be in alignment with one another. The discontinuities in the jackets of each layer are still spaced circumferentially around the column from one another and also from the discontinuities of the jackets of the adjacent layer or layers, as is shown in FIG. 7.

The present invention is also well-suited for reinforcement of wood utility poles, which are typically 12" to 18" in diameter and 30' to 80' high. A composite reinforcing jacket according to the present invention which is made to the diameter of a utility pole is typically approximately 4' to 6' in height and approximately 12" to 18" in diameter. For a retrofitting on a utility pole in service, a hole is dug around the pole, giving approximately 6" of clearance on all sides. Dirt adhering to the pole is removed from the pole and the pole coated with the urethane or other suitable adhesive system with bacteria and micro-organism inhibitors. The jacket is opened up at the discontinuity and slid into position around the pole. A second jacket is placed around the pole with its discontinuity positioned 180° around the circumference of the pole from the discontinuity of the first jacket. Third and fourth jackets can be placed around the underlying jackets, with the discontinuity of the third jacket placed at 90° to the discontinuity of the first jacket and the discontinuity of the fourth jacket at 180° to the discontinuity of the third jacket. In order to protect the pole from heat and fire, a fire-resistant ablative material of known composition, such as iron oxide, can be included in the composite reinforcement members. For example, the fire-resistant material can be mixed in with the resin in the resin bath.

The present invention can also be used in the repair of pilings on wharfs and docks due to either erosion from the sea water or from the banging of ships. The jackets of the present invention are set in place using adhesive. The urethane adhesive systems described above are activated by water and, therefore, the moisture in the piling does not adversely affect its adherence. In fact, the water could provide a tighter fit for the jacket.

The composite reinforcement jackets and methods described thus far are well suited to retrofit existing supports, such as concrete columns, as well as to reinforce newly-constructed supports. By a further aspect of the present invention, it is possible to achieve additional saving in time and costs in the construction of new concrete columns. In this aspect of the present invention, the composite reinforcing jacket is constructed first as an elongate form. The composite materials which can be used to construct the form are the same as the materials used in the composite reinforcement jackets described earlier herein. The elongate jacket has open ends and is secured, usually in a vertical orientation, at the location where the concrete column is to be constructed. When the jacket is secured in place, concrete is poured into the upper open end of the jacket in the conventional manner for pouring concrete columns. If desired, steel reinforcing bars can be positioned inside the jacket prior to the pouring of the concrete. When the poured concrete has cured, the jacket, which acted as the form for pouring the concrete, is left in place to provide the reinforcement which the earlier embodiments described herein provide. As with the other embodiments, the thickness of the jacket is determined by the forces expected to be encountered.

Figure 10:
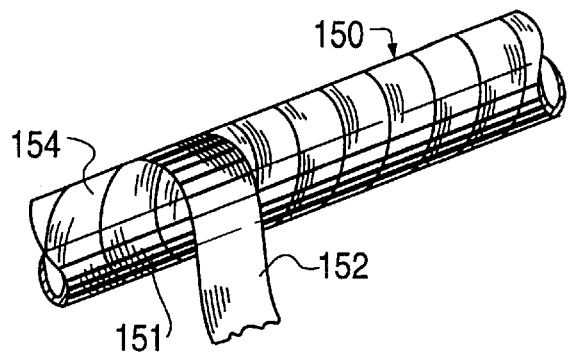
FIG. 10 is a schematic representation of the forming on a mandrel of a third embodiment of a composite reinforcing jacket according to the present invention.

As can be appreciated from FIG. 10, an elongate jacket 150 can be made by feeding webs 151 and 152 of unidirectionally, bidirectionally or tridirectionally oriented fibers or filaments through a resin bath to completely impregnate and embed the fibers in a matrix of the resin and then removing excess resin. The web 151 is wound helically around an elongate mandrel 154, such as a cylindrical mandrel, in a first direction, for example at a 45° angle to the longitudinal axis of the mandrel, to make a first layer having a cylindrical shape. The second web 152 is wound helically over the first web 151 in an opposite direction, for example, at a 45° angle with respect to the longitudinal axis of the mandrel 154, but on the opposite side of the longitudinal axis from the angle of the first web. Thus, one web is wound at a positive angle with respect to the axis, the next web wound at a negative angle, and so on, so that a herringbone pattern is present. In turn, the webs 151 and 152 can be attached near one end of the mandrel and the mandrel rotated as each web is fed progressively along the mandrel to form a continuous helix in which adjacent convolutions of the helix are in abutment with one another so that no spaces are left in the composite member which is being formed. Prior to wrapping the web onto the mandrel, the mandrel is sprayed with a coating of a release material so that the completed jacket can be slipped axially from the mandrel after the jacket has been formed and the resin fully cured.

Reinforcement jackets of the present invention were tested by subjecting a series of concrete cylinders to compression loads by using the "Standard Test Method for Compressive Strength of Cylindrical Concrete Specimens" of the American Society for Testing and Materials, Designation: C39. The test cylinders were concrete cores 6" in diameter that are ordinarily cast to test the strength of a concrete batch. Normally, the concrete cores have a compression strength of 4,000 to 6,000 psi. This was confirmed by subjecting an unreinforced concrete core to an increasing compression load. As can be seen from FIG. 11, the bare, unreinforced core withstood a load of about 6,000 psi before failing. Upon failure, the concrete core failed suddenly and totally, being unable to withstand any load whatsoever.

Figure 11:
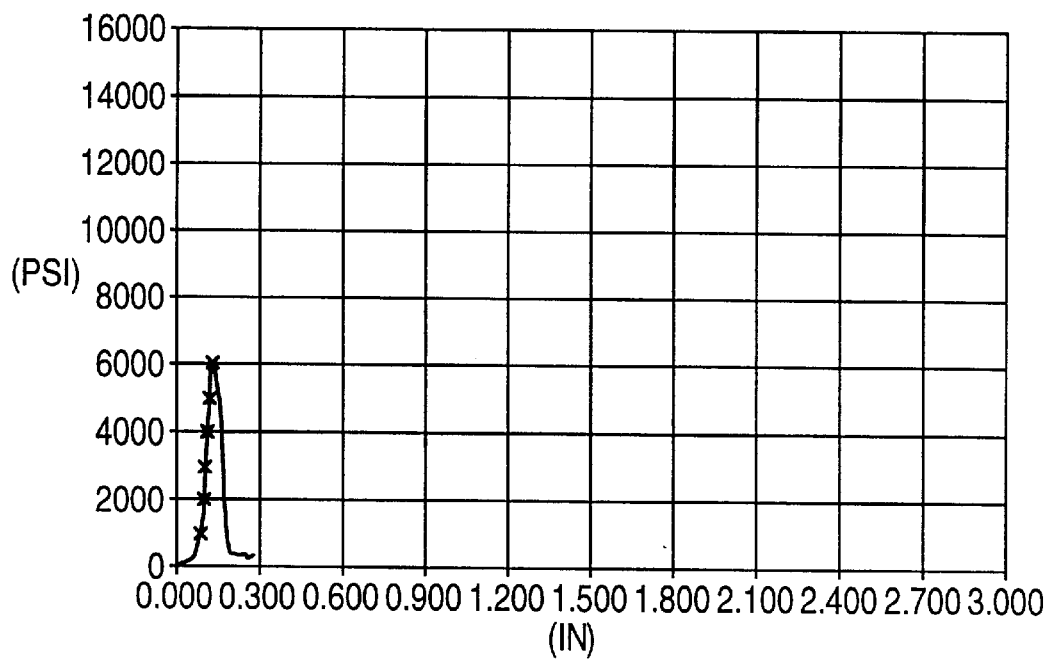
FIG. 11 is a compressive load vs. position curve from a test of a bare concrete test cylinder.
Figure 12:
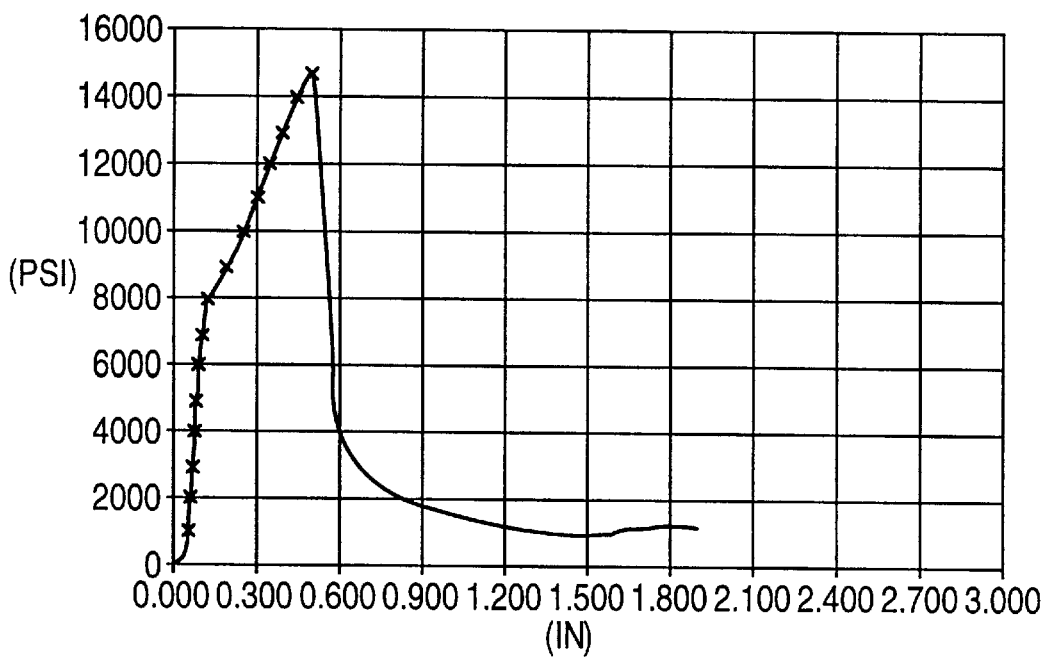
FIG. 12 is a compressive load vs. position curve from a test of a concrete test cylinder reinforced by a reinforcing jacket containing glass fibers.

FIG. 12 shows the results of one test in which a core having the same size and composition as the core whose test results is shown in FIG. 11 was reinforced with four layers of reinforcing jackets having the general shape of the jackets of FIG. 3, but containing glass reinforcing fibers rather than the high elongation fibers which are used in the jackets according to the present invention. The jackets were adhered to the concrete column using an expanding urethane concrete adhesive system. As can be seen, the reinforced concrete core withstood over 14,700 psi of compressive force before failure. At the point of failure, the test cylinder had been compressed in the axial direction by about 0.5 inches, as opposed to the approximately 0.14 inches of the bare concrete test cylinder.

The ductility of concrete structures and their toughness, that is their ability to absorb energy before failure, is further enhanced by the use in the reinforcement jackets of fibers having a high ultimate elongation. Greater ductility and toughness can be achieved with the use of high tensile strength fibers having an ultimate elongation of more than 8% and, preferably, at least about 20%. Nylon fibers, for example, nylon fibers produced by Allied Signal Corporation under the name Stagard Caparan Nylon 6 have an ultimate elongation of about 20%, a tensile strength of 140,000 psi, a modulus of elasticity of 750,000 psi, and a toughness of 15,000 psi. These nylon fibers shrink about 12% at 350° F., and have a melting point of 428° F. and a specific gravity of 1.16. As another example, polyester fibers produced by Allied Signal under the name Stagard Polyester are polyester fibers having an ultimate elongation of about 22%, a tensile strength of 150,000 psi, a modulus of elasticity of 1,400,000 psi, and a toughness of 17,000 psi. These polyester fibers shrink about 25% at 350° F., and have a melting point of 488° F. and a specific gravity of 1.38.

Figure 13:
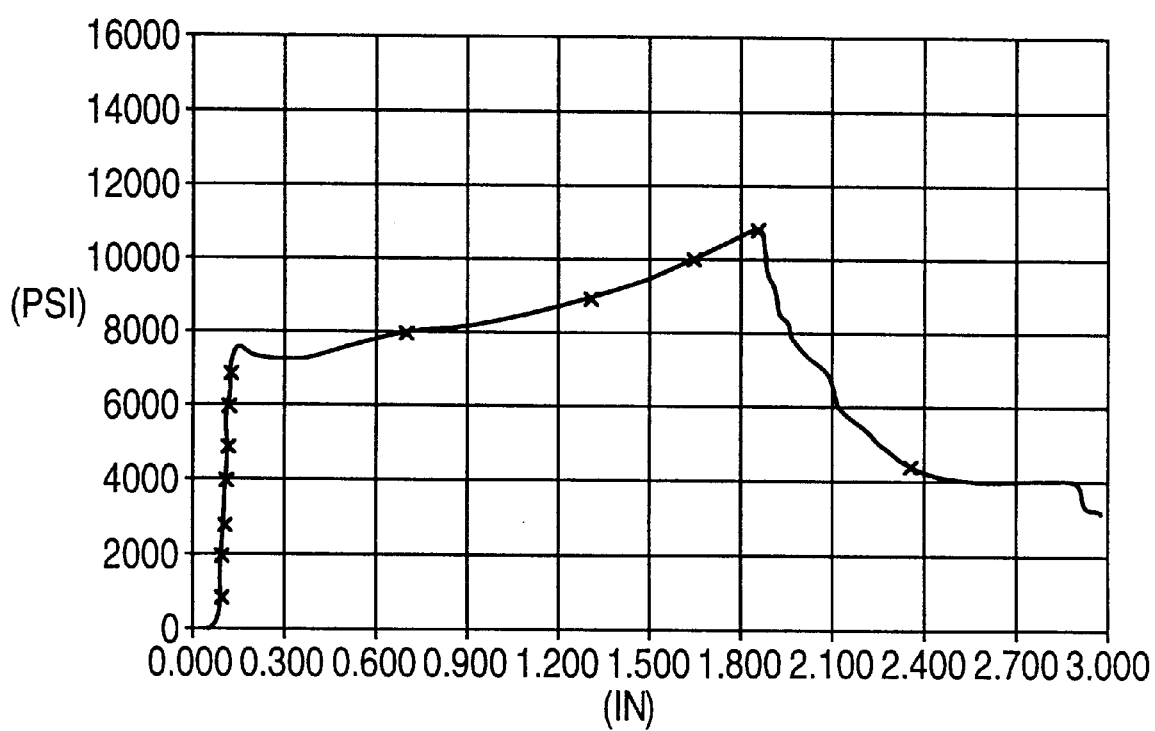
FIG. 13 is a compressive load vs. position curve from a test of a concrete test cylinder reinforced by a reinforcing jacket containing high elongation polyester fibers according to the present invention.

FIG. 13 shows the test results for a test cylinder reinforced with four layers of the reinforcing jackets having high elongation fibers according to the present invention. Except for the high elongation fibers rather than glass fibers, the reinforced test sample of FIG. 13 was the same as the reinforced test sample whose results are shown in FIG. 12. Each jacket was about 0.40" thick. A compressive force was applied to the top and the bottom of the cylinder. The load applied to the cylinder, in pounds, is indicated on the vertical axis, and the compression of the cylinder in inches in the axial direction is indicated on the horizontal axis. The test specimen had an axial height of about 10 inches and a diameter of about 6 inches. The cross-sectional area of the specimen was 28.247 inches. Since the load was applied to this area, and the area was constant, the load shown on the vertical axis of FIG. 13 is a measure of the compressive stress applied to the specimen. As can be seen from FIG. 13, the test sample reinforced with the jackets according to the present invention withstood loading of almost 8,000 psi before undergoing substantial compression in the axial direction. However, even in undergoing the compression, the test cylinder continued to withstand the compressive load and even higher compressive loads, going up to a loading of about 10,800 psi before failure. Even after failure, the test cylinder was able to withstand a considerable load.

The toughness of a material is defined by the area under the entire stress-strain curve for the material. It is a measure of the strain energy per unit volume required to rupture a material. Toughness is an important engineering property, since it indicates the ability of a material to absorb energy loads before rupture. The area under an entire stress-strain curve is a measure of the strain energy per unit volume required to rupture a material. It can be appreciated that this area is greatly increased by the present invention, especially where high elongation fibers are used. The difference can be visualized by comparing the area under the curve of FIG. 13 with the area under the curves of FIGS. 11 and 12.

It will be apparent to those skilled in the art and it is contemplated that variations and/or changes in the embodiments illustrated and described herein may be made without departure from the present invention. Accordingly, it is intended that the foregoing description is illustrative only, not limiting, and that the true spirit and scope of the present invention will be determined by the appended claims.

I claim:

1. A reinforced concrete structural member comprising:
   a primary load-bearing member having an external surface and a perimeter;
   at least one reinforcing member extending around said primary load-bearing member; and
   means for fixing said reinforcing member to said primary load-bearing member, said fixing means comprising an adhesive interposed between said primary load-bearing member and said reinforcing member;
   wherein said reinforcing member comprises a plurality of first high tensile strength filaments extending parallel to one another and a matrix of a fully cured resin, said first filaments are embedded in said matrix, and said filaments have a maximum elongation without failing of more than 8%.

2. The reinforced concrete structural member of claim 1, wherein said reinforcing member is a reinforcing jacket extending around at least most of the perimeter of said primary load-bearing member, and said reinforcing jacket terminates in lateral edges next to each other and defines a discontinuity at the lateral edges.

3. The reinforced concrete structural member of claim 1, wherein said filaments have a maximum elongation without failing of at least about 20%.

4. The reinforced concrete structural member of claim 1, wherein said filaments are unelongated.

5. A method of reinforcing a concrete structural member having a length and, in transverse cross section, an exterior size and shape, comprising:
   preforming a first plurality of reinforcing members each having a plurality of first high tensile strength filaments with an elongation without failing of more than 8%, wherein the first filaments are embedded in a matrix of a fully cured resin, the first filaments extend parallel to one another and transverse to the length of the concrete structural member, and the step of preforming comprises forming the reinforcing members to have, in transverse cross section, an inner shape and size substantially equal to the shape and size of a transverse cross section of the structural member;
   applying the reinforcing members to the structural member; and
   fixing the reinforcing members to the structural member with an adhesive.

6. The method of claim 5, wherein the filaments have an elongation without failing of at least about 20%.

7. The method of claim 5, wherein the filaments comprise 25%–35% by weight of said reinforcing members.

8. The method of claim 5, wherein the step of fixing comprises applying adhesive to the concrete structural member, and the step of applying the reinforcing members comprises placing the reinforcing members in contact with the adhesive.

9. The method of claim 8, wherein the step of fixing comprises spraying the adhesive onto the concrete structural member.

10. The method of claim 5, further comprising applying a second plurality of reinforcing members around the first reinforcing members, and fixing the second reinforcing members to the first reinforcing members with an adhesive.

11. The method of claim 5, wherein the applying of reinforcing members is performed while the filaments are in an unstressed condition.

12. The method of claim 5, wherein the filaments have a tensile strength of about 140,000–150,000 psi.

13. The method of claim 5, wherein said filaments are polyester filaments.

14. The method of claim 5, wherein each reinforcing member is a reinforcing jacket terminating in lateral edges next to each other and defining a discontinuity at the lateral edges, and the step of preforming comprises forming the reinforcing jackets to have, in transverse cross section, an inner shape and size substantially equal to the shape and size of a transverse cross section of the structural member.

15. The method of claim 14, wherein each said jacket has axial ends, and the step of applying comprises positioning said jackets next to one another along said primary load-bearing member, with the discontinuity in each said jacket lying along an axial line on the perimeter of said primary load-bearing member which is spaced parametrically from corresponding axial lines along which the discontinuities of adjacent jackets lie.

16. The method of claim 14, wherein said jackets are resilient, and the step of applying comprises separating by force the lateral edges of each jacket from one another, passing the lateral edges past opposite sides of the structural member, and removing the separating force from the lateral edges.

17. The method of claim 14, further comprising:

applying a second plurality of the jackets around said first plurality such that said second plurality snugly exerts pressure on said first plurality, the discontinuities of said first plurality lie along first axial lines on the perimeter of said primary load-bearing member, and the discontinuities of said second plurality lie along second axial lines on the perimeter of said primary load-bearing member, said second axial lines being spaced perimetrically from said first axial lines; and interposing adhesive between said first plurality and said second plurality.

18. The method of claim 17, wherein said first plurality has an outer diameter, and said second plurality has an inner diameter substantially equal to the outer diameter of said first plurality.

19. The method of claim 5, wherein the step of fixing comprises activating the adhesive with moisture.

20. The method of claim 5, wherein the reinforcing members have a plurality of second filaments extending parallel to one another and at an angle to said first filaments.

21. The method of claim 5, wherein the step of applying comprises wrapping the reinforcing members around the structural member from one end of the structural member to the other such that the reinforcing members cover substantially the entire structural member.

22. The method of claim 5, wherein the step of preforming comprises including a fire-resistant ablative material in the matrix.

23. A method for reinforcing a support column made of concrete to increase the load carrying capability of the support column, said support column having a length and, in transverse cross section, an exterior size and shape, comprising:

confining the concrete by surrounding the concrete with at least one jacket terminating in lateral edges next to each other, the jacket defining a discontinuity at the lateral edges, and fixing the jacket to the support column with an adhesive; and increasing the ductility of the support column by forming the jacket of continuous high tensile strength filaments extending parallel to one another, wherein the first high tensile strength filaments have an elongation without failing of more than 8%, and a resin matrix in which the high tensile strength filaments are embedded.

24. The method of claim 23, wherein the first high tensile strength filaments have an elongation without failing of at least about 20%.

25. The method of claim 23, wherein the step of fixing comprises fixing the jacket to the support column with the filaments extending transverse to the length of the support column.

26. A method of reinforcing a utility pole having a length and, in transverse cross section, an exterior size and shape, comprising:

preforming a first plurality of jackets each terminating in lateral edges next to each other, defining a discontinuity at the lateral edges, and having a plurality of first high tensile strength filaments with a maximum elongation without failing of more than 8% extending parallel to one another, wherein the first filaments are embedded in a matrix of a fully cured resin, and the first filaments extend transverse to the length of the utility pole, wherein the step of preforming comprises forming the jackets to have, in transverse cross section, an inner shape and size substantially equal to the shape and size of a transverse cross section of the utility pole;

wrapping the jackets around the utility pole; and fixing the jackets to the utility pole with an adhesive.

27. The method of claim 26, wherein the first high tensile strength filaments have an elongation without failing of at least about 20%.

* * * * *